United States Patent [19]

Ikeda et al.

[11] Patent Number: 5,189,365
[45] Date of Patent: Feb. 23, 1993

[54] METHOD OF LOCATING A FAULT IN A LOGIC IC DEVICE

[75] Inventors: Masaharu Ikeda, Imabari; Takahiro Funabiki, Ome; Kazuo Kasuga, Fussa, all of Japan

[73] Assignee: Hitachi, Ltd., Tokyo, Japan

[21] Appl. No.: 772,412

[22] Filed: Oct. 7, 1991

[30] Foreign Application Priority Data

Oct. 12, 1990 [JP] Japan .................. 2-274179

[51] Int. Cl.[5] .................. G01R 31/28; G06F 11/00
[52] U.S. Cl. .................. 324/158 R; 324/73.1; 364/578; 371/23
[58] Field of Search .................. 324/158 R, 73.1; 364/578; 371/22.1, 23, 25.1

[56] References Cited

U.S. PATENT DOCUMENTS

| 3,702,011 | 10/1972 | Armstrong | 364/578 |
| 4,228,537 | 10/1980 | Henckels et al. | 371/23 |
| 4,242,751 | 12/1980 | Henckels et al. | 324/73.1 |
| 4,769,817 | 9/1988 | Krohn et al. | 371/23 |
| 4,907,230 | 3/1990 | Heller et al. | 371/22.1 |

Primary Examiner—Ernest F. Karlsen
Attorney, Agent, or Firm—Fay, Sharpe, Beall, Fagan, Minnich & McKee

[57] ABSTRACT

A fault in a logic IC device including a plurality of logic cells is diagnosed by the use of an intentional fault. The intentional fault is introduced into a portion of logical operation data for the logic cells of the device to produce a faulty logical operation data. That portion of the logical operation data corresponds to a fault candidate which represents a location in the device at which hazard is supposed to have occurred to make it uncertain whether or not a fault exists at the location.

7 Claims, 4 Drawing Sheets

5,189,365

METHOD OF LOCATING A FAULT IN A LOGIC IC DEVICE

BACKGROUND OF THE INVENTION

This invention generally relates to a fault location or diagnosis technique useful in logic IC devices.

When a fault has occurred in actual products of, for example, logic VLSI (Very Large Scale Integration) devices, a fault diagnosis for locating the fault and investigating the cause thereof is essential for improving the quality and performance of the products.

Conventionally, as for such a fault diagnosis technique for logic VLSI devices, there is known a logic VLSI test technique which prints out, when a function of a logic VLSI device is faulty, the position of a test pattern representing a fault, an output pattern from the logic VLSI device, contents of the fault, and so on.

Incidentally, in a fault simulation for a fault location of a semiconductor device such as a logic VLSI device having a plurality of logic stages, a so-called hazard may occur, in which an undeterminable logical signal pattern which can be logically regarded as either "1" or "0", is generated due to racing of logical output signals in preceding stages, and such an undeterminable state propagates up to an output pin. The occurrence of hazard causes the test result of a device to be indefinite, and therefore the conventional technique fails to precisely locate a fault. An example of such semiconductor device may be a logic VLSI device including a sequential circuit.

An example of a problem on a fault location caused by hazard will hereinbelow be described specifically.

In a fault location technique for logic VLSI devices including a fault simulation, when the fault simulation is executed, a racing of logical states among respective signals causes a hazard in a flip-flop (for example, an RS flip-flop) in which a logical state becomes undeterminable, whereby the flip-flop is supposed to generate an output "X" (unknown) which is different from either of "1" and "0". For this reason, if this hazard has occurred on a bus on which a fault Z (for example, a degenerate fault at a single location) propagates, the fault Z cannot be detected by a test.

On the other hand, in a test of faulty logic VLSI device chips, input pins of a device chip are collectively supplied with a plurality of digital input signals forming an input pattern, and logical levels ("1" or "0") of a plurality of digital output signals derived at output pins at this time are matched or collated with expected values or levels of the device chip produced by a simulation performed with a fault-free logic ("1", "0" or "X"), and a chip under test is determined as fault-free ("DON'T CARE" determination) whenever an expected value is undeterminable ("X") due to an occurrence of a hazard.

Therefore, when the result of a fault simulation is matched with the test result of a faulty logic VLSI device, the above-mentioned hazard causes a problem that both results are not always coincident, which results in failing to locate a fault.

JP-A-3-120485 (laid open on May 22, 1991) shows an efficient fault location using a virtual gate. However, this publication does not discuss bad influences of the hazard on the fault location.

SUMMARY OF THE INVENTION

It is an object of the present invention to provide a method of locating a fault in a logic IC device which is capable of precisely locating a fault without being influenced by a hazard or the like.

According to one aspect of the invention, a method of locating a fault in a logic IC device comprises the steps of:

intentionally creating at least one logical fault in logical operation data for the logic IC device for performing a fault simulation to obtain a first logical output;

performing a simulation with fault-free logical operation data to obtain a second logical output;

matching the first and second logical outputs with each other to detect inverted locations at which the logical states of the first and second logical outputs are not coincident; and comparing faulty pin locations at which faulty logical outputs have been detected in an actually faulty logic IC device with the inverted locations, wherein it is determined that a true fault has occurred at a location at which the logical fault in the logical data has been created when the inverted locations are coincident with the faulty locations.

According to the above-mentioned method of locating a fault in a logic IC device, a fault stemming from a fault intentionally created in a predicted faulty location in a logical operation data and free of a logical state in a preceding stage, that is, free of influences of hazard or the like (a "1"-stuck-at fault which causes "1" level at an output pin which should normally present "0" level or a "0"-stuck-at fault which causes "0" level at an output pin which should normally present "1" level) and a fault "X" caused due to occurrence of hazard in a simulation to make a simulation output indeterminable are discriminated for separate comparison or collation.

Thus, even if hazard occurs in course of a simulation, determination of both locations of output pins of the device where non-coincidence takes place due to the hazard and those where non-coincidence takes place will make it possible to precisely locate faults in the device.

According to another aspect of the present invention, a method of diagnosing a fault in a logic IC device including a plurality of logic cells, the device having input pins and output pins, comprises the steps of:

testing the logic IC device with an input test pattern data applied to the input pins to determine one or more output pins of the device which provide faulty outputs;

preparing expected output data for the logic IC device for the input test pattern data;

specifying, as a fault candidate, a location in the device where hazard is supposed to have occurred to make it uncertain whether or not a fault exists at the location;

introducing an intentional fault into a portion of logical operation data for the logic cells of the device to produce a faulty logical operation data, the portion of the logical operation data corresponding to the fault candidate;

performing fault simulation using the input test pattern data and the faulty logical operation data to produce a faulty simulation output data for the output pins;

comparing the fault simulation output data with the expected output data to find any output pin where non-coincidence results therebetween and determining whether or not the found output pins correspond to any one of the one or more output pins of the device which provide faulty outputs in the testing step; and recognizing the fault candidate as a fault when the found output pins correspond to any one of the one or more output pins of the device which provide faulty outputs in the testing step.

DESCRIPTION OF THE PREFERRED EMBODIMENTS

An embodiment of a method of locating a fault in a logic IC device according to the present invention will hereinbelow be described in detail with reference to the accompanying drawings.

Figure 1:
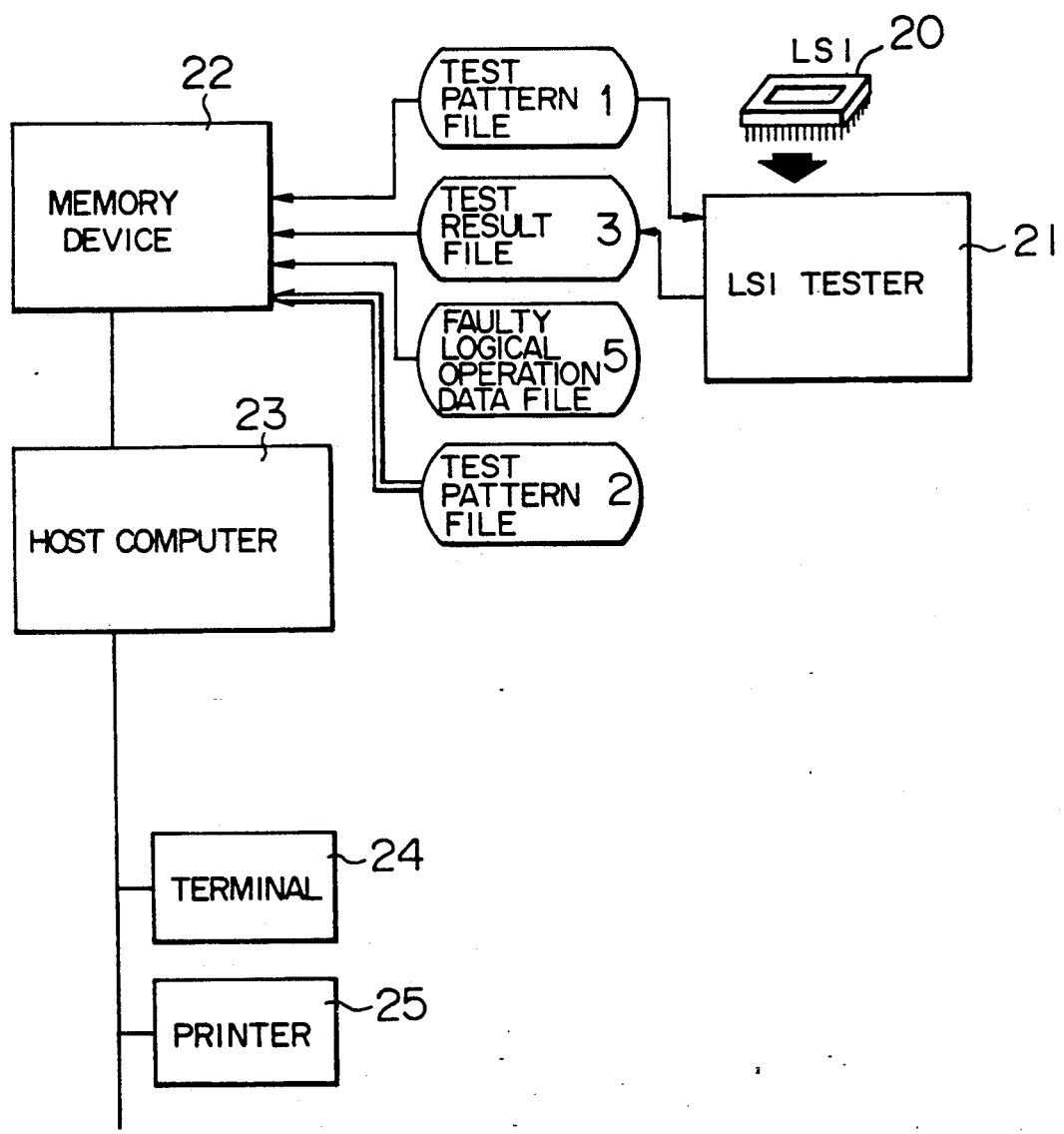
FIG. 1 is a schematic diagram illustrating an example of a hardware configuration used in locating a fault in a logic IC device according to an embodiment of the present invention.
Figure 2:
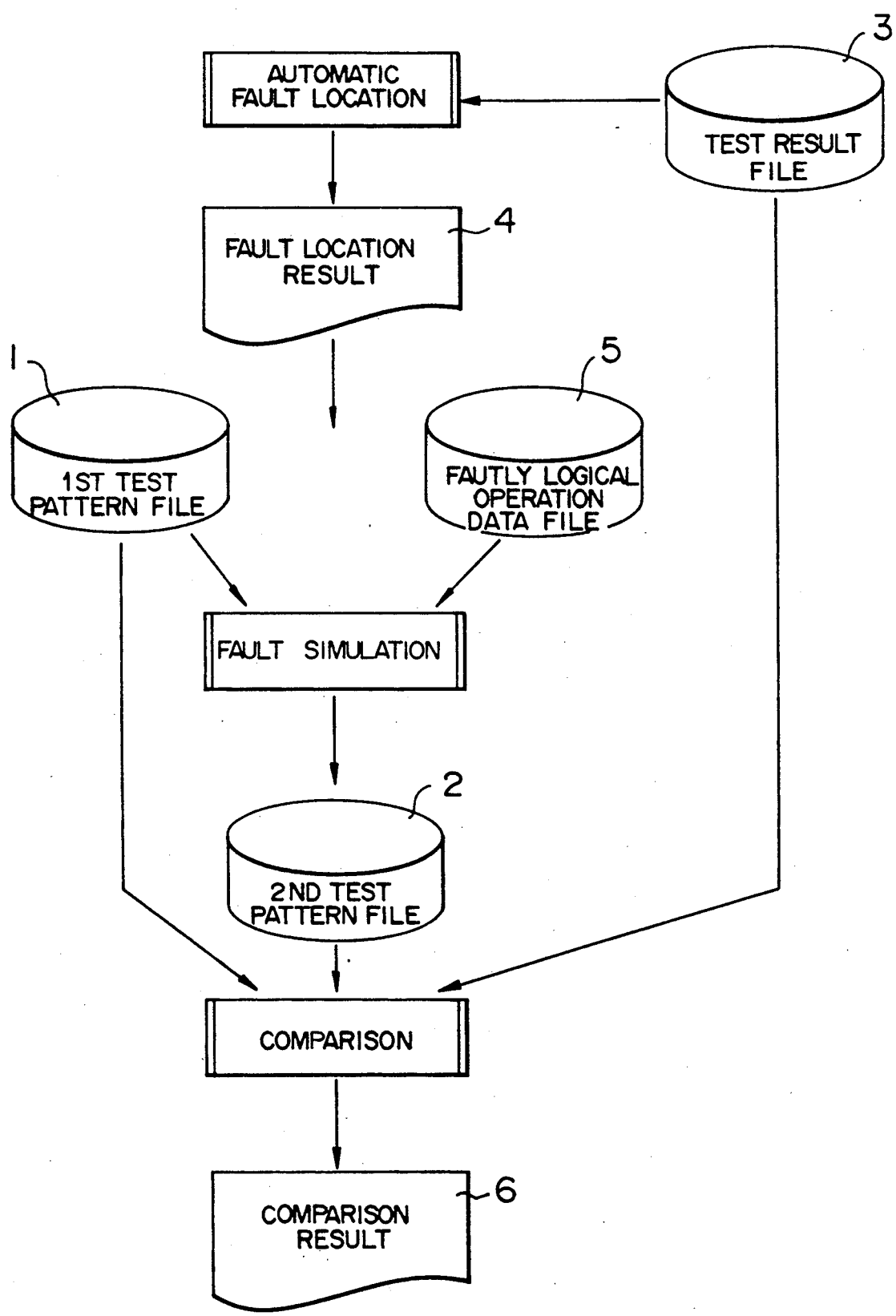
FIG. 2 is a flowchart illustrating an example of a method of locating a fault in a logic IC device which is an embodiment of the present invention.
Figure 3:
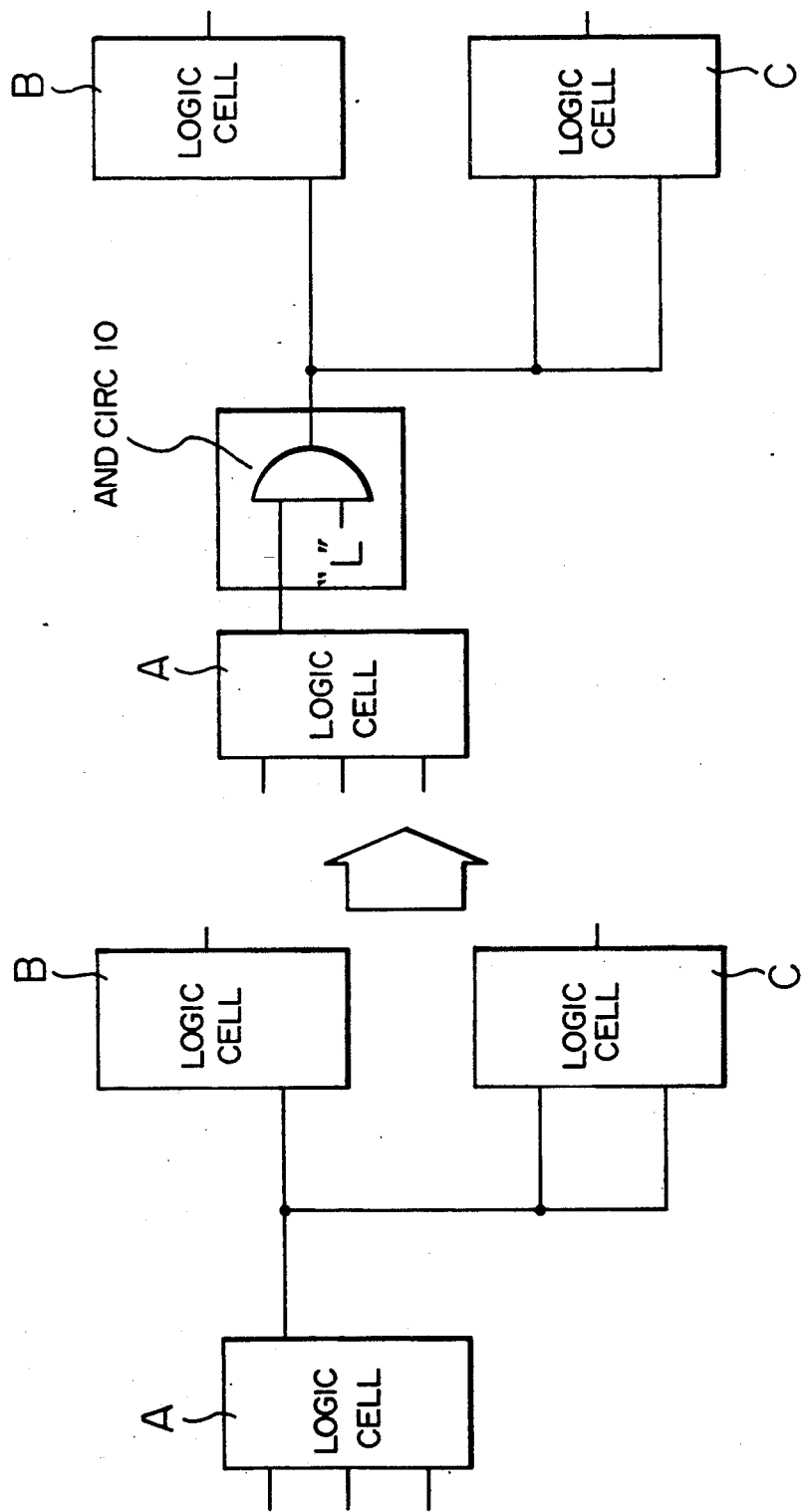
FIG. 3 is a block diagram used for explaining an example of the operation of the fault location.
Figure 4:
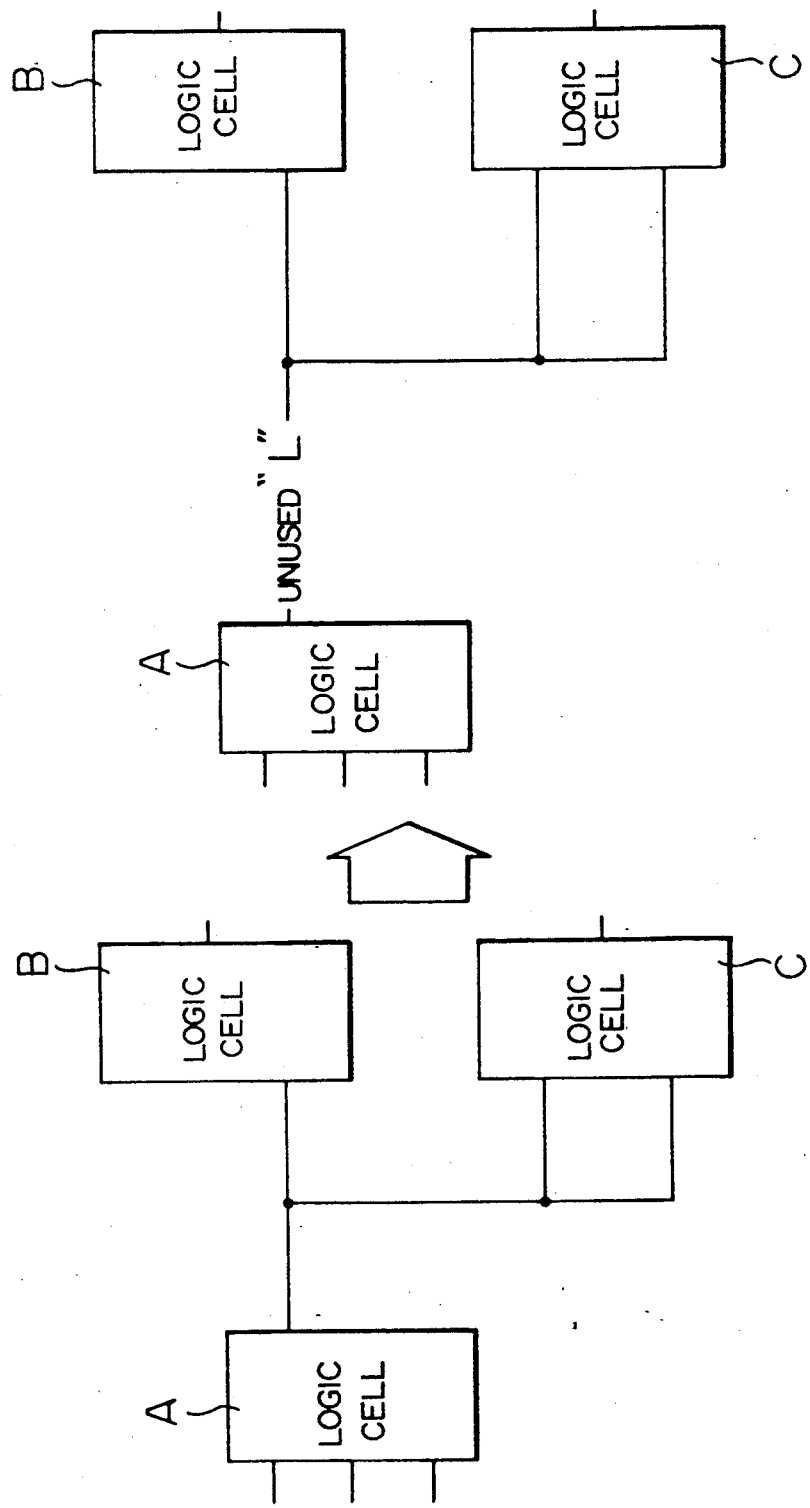
FIG. 4 is a block diagram similarly used for explaining an example of the operation of the fault location.

FIG. 1 shows an example of a hardware configuration for executing the method of locating a fault in a logic IC device, FIG. 2 shows an example of a processing flow of the fault locating method, and FIGS. 3 and 4 are block diagrams for explaining the operation of the fault locating method.

In FIG. 1, data stored in files 1, 2, 3 and 5 are transferred to a memory device 22 coupled to a host computer 23 for use in executing the steps shown in FIG. 2 by the computer 23, whenever necessary. A terminal 24 is employed to instruct execution of various steps and to provide data for intentional faults to be incorporated into a logical operation data. A printer 25 may be employed to print out a result of fault location, though it could be recognized on the terminal 24.

Referring now to FIGS. 1 and 2, a logic IC device 20 in which a fault has actually occurred is tested by an LSI tester 21, and a known AFL (Automatic Fault Location, refer, for example, to "1990 International Test Conference" pp. 860-870) is performed on the basis of its test result (for example, information on input and output values on respective pins of the tested device chip, the number and positions of faulty input and output pins and so on) recorded in a test result file 3 to obtain a fault location result 4 which includes, for example, information on coordinates, type and function of a faulty logic cell, whether the fault has found on the output side or input side of the cell, and so on.

In the test result file 3, there are recorded logical states at respective input and output pins of a logic IC device, not shown, such as a logic LSI device and a logic VLSI device in a tri-state logic which represents logical states by "0", "1" and "X" (unknown).

Then, if there exists an ambiguous fault condition rendered undefinable due to a hazard or the like in the fault location result 4 obtained by producing an unknown output "X" due to hazard in data recorded in the test result file 3 and executing the AFL, one or more "stable" faults F, which are not influenced by hazard or the like, are intentionally produced in logical operation data which is to serve as input data for a fault simulation, later referred to, by a method shown, for example, in FIGS. 3 and 4, and logical operation data including the faults F is stored in a faulty logical operation data file 5.

More specifically, as shown in FIG. 3, a logic cell A at a certain stage, including at least a flip-flop, is arranged to receive a plurality of inputs (three inputs in FIG. 3) and supply its output to two logic cells B and C in a rear stage. In this state, if it is supposed, judging from the fault location result, that a "0"-stuck-at fault F (which refers to a state in which "0" is outputted due to a fault, where "1" should be otherwise present, and will hereinbelow be simply called the "fault F"), for example, has occurred due to a hazard in logical data outputted from the logic cell A to the two logic cells B and C in a rear stage in parallel, a virtual gate circuit, for example, a virtual AND circuit 10, is additionally interposed between the logic cell A and the logic cells B, C on an output signal line from the logic cell A to create the "stable" fault F to thereby prevent the hazard occurring on the preceding stage side of the logic cell A from influencing the logic cells B and C.

This AND circuit 10 has one of two inputs coupled to the output from the logic cell A and the other one maintained at "L" level ("0"), so as to continuously supply the logic cells B and C in a rear stage with a logical signal "0". Stated another way, the output from the logic cell A can be made equal to the "stable" fault F free of the influence of the hazard occurring on preceding stage side. On the contrary, if it is supposed that a "1"-stuck-at fault has occurred in logical data supplied from the logic cell A to the logic cells B and C, an OR circuit having one input supplied with "H" level may be interposed in place of the AND circuit.

Incidentally, such a method of creating a fault F in logical operation data at a particular location may also be implemented by a configuration shown in FIG. 4. More specifically, in FIG. 4, an output signal line from the logic cell A on which a fault has occurred is made unused, and the logic cells B and C in a rear stage are supplied with an input signal fixed at LOW ("0") or HIGH ("1"), to thereby create a stable fault F equal to that explained in connection with FIG. 3 and free of the influence of the hazard on preceding stage side.

Next, a fault simulation is executed using logical operation data read out of the file 5 in which the fault F has thus intentionally been created at a location of a fault candidate which cannot be specified due to hazard and an input test pattern read out of a first test pattern file 1. This first test pattern file 1 records expected values which have been obtained by a simulation with fault-free logic and input patterns used in the simulation. As the result of the fault simulation, information reflecting the "stable" fault F, similar to the information recorded in the file 3, is recorded in a second test pattern file 2. More specifically, output values reflecting the intentionally created fault in the above described manner are recorded for each test pattern in the second test pattern file 2. It will be appreciated that the fault F (the intentionally created fault as described above) which has been made undeterminable due to the hazard is ensured to appear in the output values.

Afterward, a comparison processing is executed for matching expected output values for the input patterns of fault-free logical operation data recorded in the first pattern file 1, the output values obtained by the fault simulation which reflects the intentionally created fault, recorded in the second test pattern file 2 and the test result file 3.

In this comparison processing, expected output values at respective pins of the faulty device chip, read out of the first test pattern file 1, are matched with the output values reflecting the fault F recorded in the second test pattern file 2 to detect non-coincidence between both values. The non-coincidence refers to a location or a pin position at which the output value of the fault simulation is not coincident with the expected output value, such as "0"→"1" or "1"→"0", and "0"→"X" or "1"→"X".

The thus detected non-coincidence locations are further matched with faulty pin locations recorded in the test result file 3 to output a comparison result 6. If both of the non-coincidence locations and the faulty pin locations are coincident in the comparison result 6, it can be precisely determined that the location at which the fault F has intentionally been created is a true fault.

When a fault candidate found in a logic IC device by the fault location result 4 based on the automatic fault location (AFL) technique exists in a preceding stage to a logic cell including a flip-flop circuit (or a sequential circuit) and the structure of an input test pattern or the location of the found fault candidate is such that it is undeterminate whether occurrence of hazard will make a faulty output "H" of the logic cell in place of a correct output "L" or will make a faulty output "L" of the logic cell in place of a correct output "H", fault location for or diagnosis of the IC device is possible free from influences of the hazard by the following steps of operation.

Namely, a "stable" (intentional) fault is incorporated or introduced into an input to an output of the logic cell in question in a logical operation data for the IC device, and a fault simulation is effected with the fault including logical operation data to produce a faulty simulation data similar to the content of the second test pattern file 2, like in the above-mentioned embodiment.

In the succeeding comparison steps, data in the file 1 and data in the file 2 are compared for each output pin of the IC device to provide the following sets of data.

A. Sets of an output pin No. (output pin location) and an input test pattern No. with which an intentional fault F caused a fault simulation output (data in the file 2) to be inverted with respect to a corresponding fault-free logical operation simulation output (data in the file 1).

B. Sets of an output pin No. (output pin location) and an input test pattern No. with which an intentional fault F caused hazard to make a fault simulation output (data in the file 2) undeterminable, although a corresponding fault-free logical operation simulation output (data in the file 1) is determinate.

C. Sets of an output pin No. (output pin location) and an input test pattern No. with which an intentional fault F caused existing hazard to disappear to make a fault simulation output (data in the file 2) determinable, although a corresponding fault-free logical operation simulation output (data in the file 1) is undeterminable.

Next, the pin locations in the respective sets of data are matched or collated with faulty pin locations recorded in the test result file 3. If they are coincident with each other, it can be determined that the location at which a fault F has intentionally been introduced is a true fault location.

In the second-mentioned embodiment, since introduction or incorporation of an intentional fault is effected as described above, fault location is possible by the use of the fact that a fault simulation output is made undeterminable in a case in which a fault-free logical operation simulation output is determinate, and is possible by the use of the fact that a fault simulation output is made determinate in a case in which a fault-free logical operation simulation output is undeterminable. Thus, fault location in cases in which a fault-free logical operation simulation output or a fault simulation output is unterminable due to hazard is possible, which has not been conventionally possible.

The effects produced by the above described embodiments may be summarized as follows:

(1) A fault can be precisely located free of hazard or the like; and (2) A speed and accuracy of a fault analysis for logic IC devices can be largely improved.

We claim:

1. A method of locating a fault in a logic IC device based on a tri-value logic using a computer, comprising the steps of:
   intensionally creating at least one logical fault in logical operation data for said logic IC device for performing a fault simulation to obtain a first logical output;
   performing a simulation with fault-free logical operation data to obtain a second logical output;
   matching said first and second logical outputs with each other to detect inverted locations at which the logical states of said first and second logical outputs are not coincident; and
   comparing faulty pin locations at which faulty logical outputs have been detected in an actually faulty logic IC device with said inverted locations,
   wherein it is determined that a true fault has occurred at a location at which said logical fault in said logical data has been created when said inverted locations are coincident with said faulty pin locations.

2. A method according to claim 1, wherein said logical fault is created by the provision of a virtual logic gate which outputs a particular logical state without being influenced by a logical input from a preceding stage.

3. A method according to claim 1, wherein a logical fault is created at a predicted fault location by a signal line on which a logical signal propagates.

4. A method of diagnosing a fault in a logic IC device including a plurality of logic cells, said device having input pins and output pins, the method comprising the steps of:
   testing said logic IC device with an input test pattern data applied to said input pins to determine one or more output pins of said device which provide faulty outputs;
   preparing expected output data for said logic IC device for said input test pattern data;
   specifying, as a fault candidate, a location in said device where hazard is supposed to have occurred to make it uncertain whether or not a fault exists at said location;
   introducing an intentional fault into a portion of logical operation data for said logic cells of said device to produce a faulty logical operation data, said portion of said logical operation data corresponding to said fault candidate;
   performing fault simulation using said input test pattern data and said faulty logical operation data to produce a fault simulation output data for said output pins;
   comparing said fault simulation output data with said expected output data to find any output pin where non-coincidence results therebetween and determining whether or not said found output pin corresponds to any one of said one or more output pins of said device which provide faulty outputs in said testing step; and recognizing said fault candidate as a fault when said found output pin corresponds to any one of said one or more output pins of said device which provide faulty outputs in said testing step.

5. A method according to claim 4, wherein said intentional fault introducing step includes adding a virtual logic gate circuit in such a manner that said virtual gate circuit intervenes between logic cells proceeding and succeeding said portion of said logical operation data, said virtual logic gate circuit having a first input kept at a predetermined logic level, a second input coupled to an output of said logic cell preceding said portion and an output coupled to a logic cell succeeding said portion.

6. A method according to claim 4, wherein said intentional fault introducing step includes replacing a data on said portion of said logical operation data by data at a predetermined logic level.

7. A method of diagnosing a fault in a logic IC device including a plurality of logic cells, said device having input pins and output pins, the method comprising the steps of:

testing said logic IC device with an input test pattern data applied to said input pins to determine one or more output pins of said device which provide faulty outputs;

preparing expected output data for said logic IC device for said input test pattern data;

specifying, as a fault candidate, a location in said device where hazard is supposed to have occurred to make it uncertain whether a fault exists or not at said location;

introducing an intentional fault into a portion of logical operation data for said logic cells of said device to produce a faulty logical operation data, said portion of said logical operation data corresponding to said fault candidate;

performing fault simulation using said input test pattern data and said faulty logical operation data to produce a fault simulation output data for said output pins;

comparing said fault simulation output data with said expected output data to find any output pin where said intentional fault caused a fault simulation output data to be inverted with respect to a corresponding expected output data, any output pin where said intentional fault caused hazard to make a fault simulation output data undeterminable, although a corresponding expected output data is determinate, and any output pin where said intentional fault caused existing hazard to disappear to make a fault simulation output data determinable, although a corresponding expected output data is undeterminable, and determining as to whether said found output pin corresponds to any one of said one or more output pins of said device which provide faulty outputs in said testing step; and recognizing said fault candidate as a fault when said found output pin corresponds to any one of said one or more output pins of said device which provide faulty outputs in said testing step.

* * * * *